Aug. 30, 1932.  F. SIEBER  1,873,983
ELECTRICAL APPARATUS
Filed June 3, 1927  2 Sheets-Sheet 1
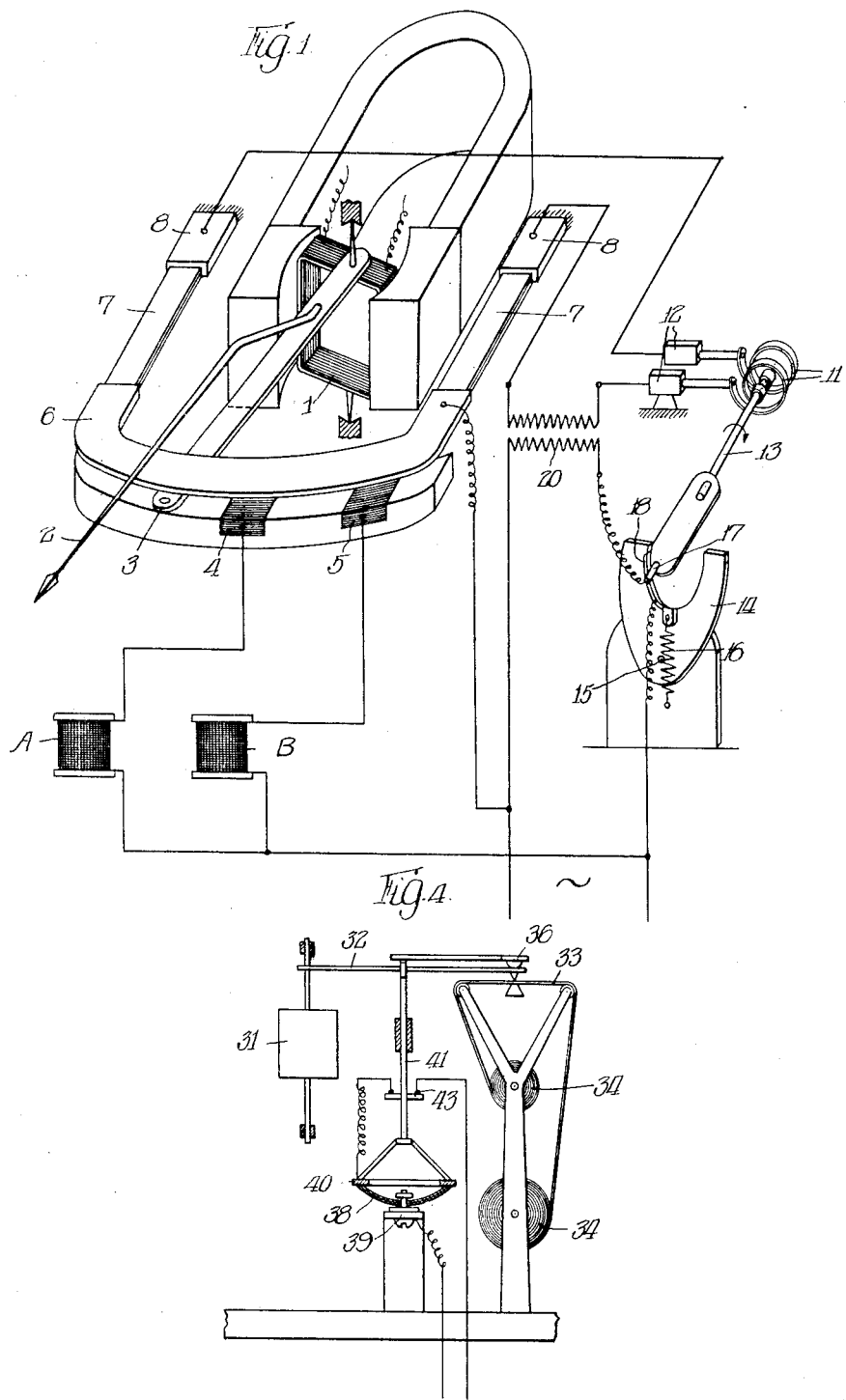
Inventor:
Fritz Sieber, Aug. 30, 1932.   F. SIEBER   1,873,983
ELECTRICAL APPARATUS
Filed June 3, 1927   2 Sheets-Sheet 2
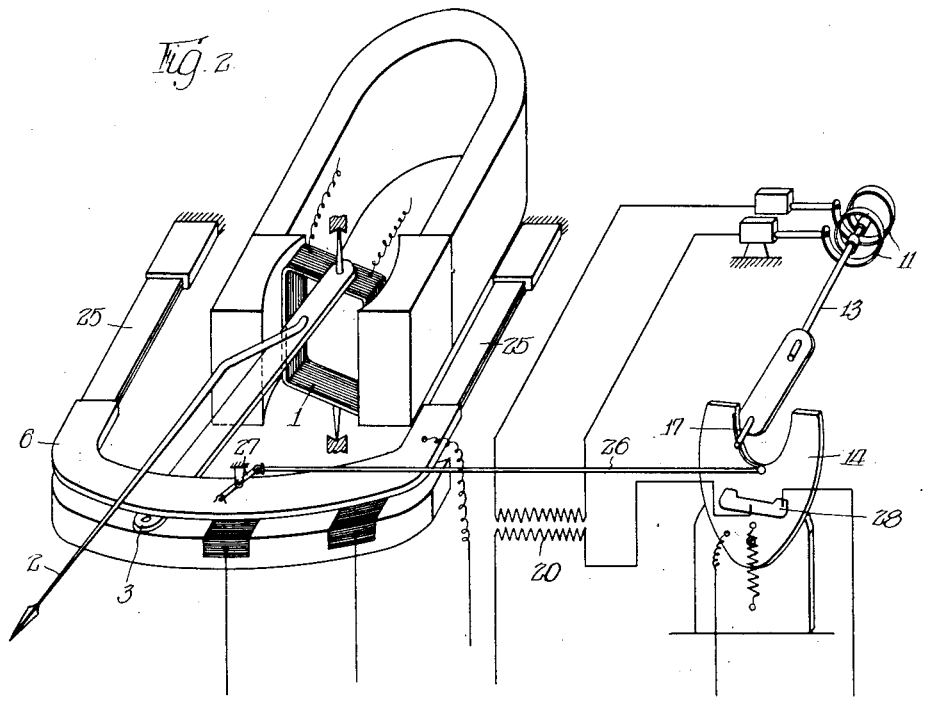
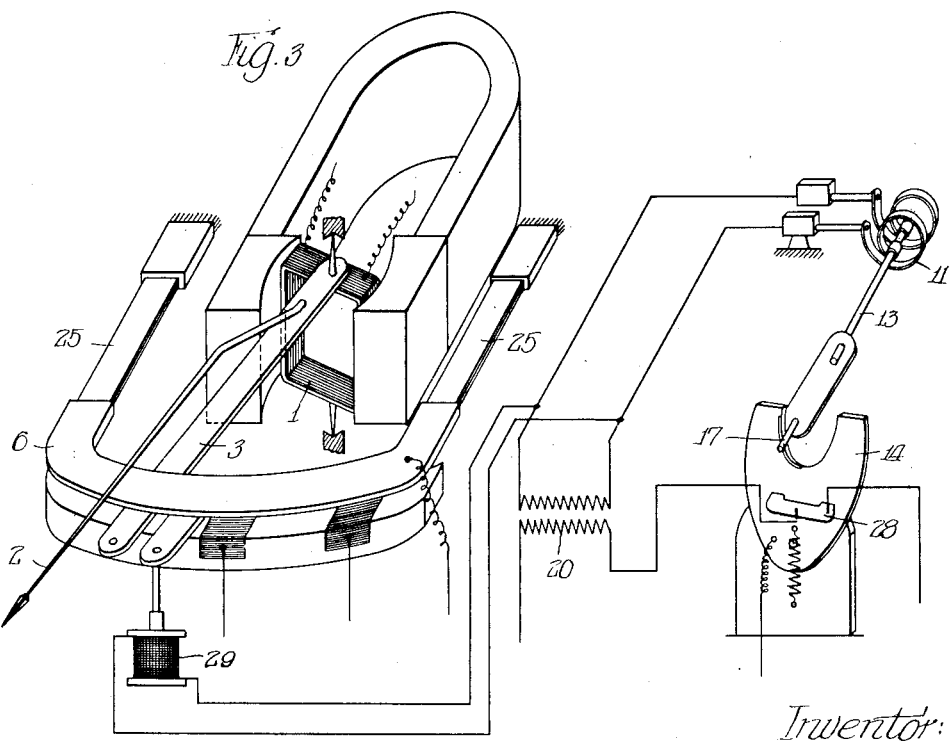
Witness:
R. Burkhardt
Inventor:
Fritz Sieber,
By Cromwell, Greist & Warden
Attys Patented Aug. 30, 1932

1,873,983

UNITED STATES PATENT OFFICE

FRITZ SIEBER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ELECTRICAL APPARATUS

Application filed June 3, 1927, Serial No. 196,387, and in Switzerland June 18, 1926.

This invention relates to electrical apparatus, and it has particular relation to a novel thermoelectric motor mechanism especially suited for operation in conjunction with electrical instruments, or the like, although in its broad aspects it is not limited thereto.

Among the objects of the invention is the provision of an auxiliary mechanism for performing electrical operations, such as the periodical actuation of a pointer in an electrical meter or other instrument, in which the periodical action is derived from a thermostatic element such as a bimetal strip or plate that is cyclically heated and cooled.

The invention will be best understood from the following description of exemplifications thereof, reference being had to the accompanying drawings, wherein Fig. 1 is a diagrammatic view in perspective of an electrical contact-making instrument embodying one form of the invention; and Figs. 2 to 4 are views similar to Fig. 1 illustrating modified forms of the invention.

The deflectional force exerted by the moving system of an electrical measuring instrument, particularly if of the direct-reading type, is usually very small. It would be inexpedient and uneconomical to make this force larger than necessary to insure positive movement of the pointer or indicating means. The available torque is ordinarily insufficient for direct utilization of such indicating means to automatically record the position thereof or to open and close contacts because of the excessive friction caused by the movement of the recording pen or the sticking of the contact members incident to the current flow. While in some of the recording instruments the moving system is especially designed to develop the larger torque so necessary, other more preferable constructions utilize auxiliary means for effecting the recording or contact-making operations without materially changing the deflecting mechanism as compared to ordinary direct-indicating instruments. The auxiliary mechanism usually comprises means for periodically clamping or pressing down the pointer or indicating means, thereby establishing either a record in the form of a series of dots or effecting closure of circuits depending upon the position of the indicating mechanism.

The present invention provides a novel and simple auxiliary operating mechanism of the foregoing character which is particularly suitable for use in recording or contact-making instruments but in its operation is not limited thereto. In the novel mechanism use is made of the very considerable molecular forces brought into play when metals are subjected to changes in temperature, for instance, bimetal strips or plates. To this end, a bimetal strip, for instance, is alternately heated and cooled and the resulting movement of the strip is utilized to periodically press down or clamp the pointer to effect the recording or contact-making operation. In the preferred construction the movement of the bimetal strip is also utilized to make and break an electrical heating circuit whereby its alternating heating and cooling is secured. Such auxiliary mechanism serves to greatly simplify the construction of instruments of the foregoing type and permits the accommodation of contact-making or recording instruments within compact casings of a size approximately the same as those of the ordinary instruments.

Instruments of the type referred to hereinabove, but equipped with the auxiliary mechanisms of the prior art, are described and shown in the book of G. Keinath, entitled "Die Technik Der Elektrischen Messgerate", page 79, etc., published in Berlin, 1922.

In the form of the invention shown in Figure 1 a contact-making electrical indicating instrument comprises a moving element 1 in the form of a coil arranged to be deflected in response to a current traversing the coil, for instance, of a type familiar in the art. The moving element 1 carries a pointer 2 having associated therewith a contact arm 3 for establishing control circuits when said pointer is deflected to certain positions, for instance, opposite the contact members 4 or 5. To this end, a clamping segment 6 is mounted above the plane in which the contact arm 3 is rotated by the moving element 1. The contact segment 6 is connected to one pole of an electrical circuit and when said segment is pressed down on the contact arm 3 opposite the contact members 4 or 5, a circuit is established from the contact segment 6 through the contact arm 3 to either of the contact members 4 or 5. When the contact arm is in a position away from said contact members 4 or 5, the downward movement of the clamping segment 6 fails to establish a circuit because on its downward movement the contact arm 3 fails to meet a contact member that is connected to another pole of the circuit.

The downward pressing or clamping of the segment 6 is periodically effected, according to my invention, through the alternate heating or cooling of a thermostatic element such as bimetal strips. To this end, the segment 6 is secured to the ends of two bimetallic strips 7 which have their other ends suitably anchored as at 8 within the instrument. The arrangement is such that current may be caused to flow through the path of the two bimetallic strips 7 and the segment 6 held thereby, said current serving to heat the bimetallic strips and thereby deflecting downwardly the segment 6 until it causes the contact arm 3 to be pressed down, as explained hereinabove. By interrupting the current through the path including the two bimetallic strips 7, they are permitted to cool and return to normal position, thereby releasing the contact arm 3 to permit the same to be rotated freely again by the deflecting element 1 of the instrument until such arm is again clamped down by the clamping segment 6 when the two bimetallic strips 7 are again energized and heated.

The periodical heating and cooling of the bimetallic strips 7 or the thermo-element, which causes the cyclical clamping of the contact arm 3, is effected by a thermo-responsive mechanism comprising a bimetallic strip 11, which may be in the form of a bifilar spiral having its two outer ends held by a pair of supporting contact members 12 that are fixed within the instrument frame. The inner ends of the spiral 11 are close-circuited and hold a spindle 13, the movement of which serves to control an oscillator switch 14 which effects closure and opening of the heating circuits of the bimetallic strips 7 as well as of the bimetallic spiral 11.

The switch is shown diagrammatically in the form of a U-shaped oscillator member which is pivoted at 15 and is pulled by a spring 16 either to the right or to the left. The forward end of the spindle 13 has an offset pin 17 adapted to engage the inner sides of the U-shaped oscillator 14 when said spindle is rotated in clockwise or counter-clockwise direction incident to heating and cooling of the bimetallic spiral 11. The left-hand inner side of the oscillator 14 carries a contact member 18 which, in conjunction with the pin 17, serves to establish an electric circuit for energizing the primary winding of a transformer 20, the secondary winding of which is connected in series relationship with the path through the two bimetallic strips 7 and the bimetallic spiral 11.

When the primary winding of the transformer 20 is energized through the contact of the pin 17 with the contact member 18, current will flow from the secondary winding of the transformer through the spiral 11 and the strips 7, heating the same and causing deflection thereof, as explained hereinabove. When the primary circuit is opened by interrupting the contact at the pin 17, the heating current through the bimetallic strips 7 is stopped. As a result thereof, the strips return to the low temperature position.

The heating and cooling of the bimetallic spiral 11 causes rotation of the spindle 13 which in turn throws the oscillator either to the right or to the left through the action of the pin 17 on the inner sides of the oscillator. The heating of the spiral 11 rotates the spindle 13 in clockwise direction, as indicated by the arrow, and the pin 17 which bears against the contact member 18 turns the oscillator 14 towards the left. At the moment when this turning movement has reached a point at which the oscillator 14 has passed the position of unstable equilibrium, the spring 15 will suddenly pull over the oscillator 14 to the left with a snap motion. This interrupts the circuit between the pin 17 and the contact member 18, de-energizing the primary winding of the transformer 20. As a result, the supply of current to the spiral 11 and bimetallic strips 7 ceases, permitting cooling thereof. The cooling of the spiral 11 results in rotational movement of the spindle 13 in counter-clockwise direction until the oscillator 14 is suddenly snapped over to the opposite side, again bringing the contact member 18 to the opposite side. The contact member is thus again brought into engagement with the pin 17, re-establishing the energizing circuit of the transformer and re-starting the heating of the bimetallic strips 7 and of the spiral 11.

This sequence of operation automatically repeats itself and in consequence thereof the bimetallic strips 7 periodically clamp down the contact arm 3, while on the other hand, the bimetallic spiral 11 effects periodical closure and opening of the heating circuit. Since the two bimetallic strips 7 are connected in series with the spiral 11, the periodicity of the movements of the strips and the spiral is the same.

The cooperative action of the contact arm 3 and the associated clamping segment 6 may be utilized in any suitable manner for the purpose of controlling other apparatus such, for example, as furnace regulating equipment or governing means for automatic rectifier installations. As is shown in Fig. 1, such controlling action might be provided through the agency of a "Start" relay device having an operating coil A and a "Stop" relay device having an operating coil B, such coils being connected across the supply line shown, for the purpose of performing their respective functions, the connection being made through their associated contact members 4 and 5, segment 6, and the interposed free end of arm 3. When current conditions in armature 1 are such as to place the free end of arm 3 over contact 4, subsequent clamping action of segment 6 will effect excitation of coil A, the latter in turn operating to start its associated regulating gear or the like. When current conditions in armature 1 are such as to place the free end of arm 3 over contact 5, subsequent clamping action of segment 6 will effect excitation of coil B, the latter in turn operating to stop the regulating action of such gear. When, however, current conditions in armature 1 are such as to place the free end of arm 3 in any other position, no connection of coils A and B with the supply line will take place, and such end will operate to prevent contacting engagement of either of the members 4 and 5 with segment 6. It will therefore be seen that the improved apparatus may be made to provide for the regulation or control of any particular mechanism or device at different predetermined current conditions in armature 1, as determined by the disposition of contact members 4 and 5.

Instead of providing two separate bimetallic strips for actuating the clamping device and for operating the switch which controls the heating circuit, a single bimetallic member may be used or any other equivalent arrangement adopted.

In Figure 2 the clamping segment 6 is held above the contact arm 3 by means of a pair of springs 25 which normally hold said segment at sufficient height to permit unobstructed movement of the contact arm 3 by the moving element 1 of the instrument. The periodical clamping action of the segment 6 is secured from the oscillator switch 14 through a suitable link rod 26 acting on a lever 27 by means of which the segment 6 is pressed downwardly when the oscillator 14 is thrown to the left. In this case, a single bimetallic spiral 11 serves both for the control of the periodical clamping action of the segment, as well as for the automatic closure and interruption of the heating circuit by means of which the bimetallic strip is made to effect said clamping action.

In this arrangement the pin 17 on the spindle 13 merely serves to throw the oscillator 14 to the right or to the left, the circuit of the transformer 20 being controlled through a mercury switch 28 of familiar type held on said oscillator so as to establish a circuit to the transformer when the oscillator is toward the right, and to interrupt the circuit when the oscillator is toward the left. Instead of mechanically transmitting to the segment 6 the periodical clamping action in response to the periodical movement of the bimetallic spiral 11, as in Figure 2, such clamping action may be imparted to said segment electrically, as shown in Figure 3. To this end, the segment 6 is actuated by an electromagnet 29, which is periodically energized in response to the periodical expansion and contraction of the bimetallic strip 11.

In Figure 4 is shown another modification of the invention. A moving element in the form of a coil 31 of familiar construction is arranged to rotate a pointer or indicating means 32 in a plane above a recording roll 33 that is suitably moved underneath said pointer as by means of rolls 34. A clamping member 36 disposed transversely above the pointer 32 serves to periodically depress said pointer, causing the latter to make a mark, in the form of a dot or the like, on said paper roll 33, thereby indicating the position of the pointer at a particular instant.

The periodical clamping movement of the member 36 is effected by means of a bimetallic element in the form of a disk 38 which has its center fixed to a suitable support on the instrument frame as by means of a screw 39. The periphery of the disk 38 carries a ring 40 which in turn serves to move in up-and-down direction a shaft 41 that holds the clamping member 36. The movement of the shaft 41 serves also to alternately establish and interrupt a circuit for heating the bimetallic disk 38, as by means of contacts 43. Thus, when the disk 38 is relatively cool and in the position shown in the drawings, contact is established at 43 thereby completing a circuit leading through the contacts 43 to the ring 40, through the disk to the screw 39, which constitutes another terminal of the circuit. As a result, the disk is heated until the temperature thereof reaches a point at which it will collapse with a snap action, being now hollow towards the bottom. This causes the downward movement of the shaft 41, thereby interrupting the heating circuit at 43 and at the same time pressing down the pointer 32 for making a mark on the paper 33.

The interruption of the circuit at 43 causes the disk 38 to cool down until its temperature has reached a value at which it will return with a snap action to its former position at which the clamping member 36 is lifted from the pointer 32 and the heating circuit again established at 43.

In the foregoing arrangement only the elements necessary to understand the principles of my invention have been fully described without going into the details of the other elements of the instrument except insofar as it is necessary for a full understanding of the invention. Those skilled in the art are fully familiar with such elements and no description thereof is necessary.

My invention is susceptible of many other modifications and accordingly it is desired that the accompanying claims be given a broad construction.

I claim:

1. In a thermally operated regulating and indicating instrument, an element rotatable in response to electrical values, a contact arm carried by said element and forming a portion of an electric circuit to be controlled, a fixed plate having contact portions in the circuit to be controlled arranged beneath said arm, a reciprocatory member arranged above and adapted to move said arm into contact with said plate, thermally actuated means for causing reciprocating movement of said member, an oscillating switch to control movement of said reciprocating member, and thermally actuated means for controlling said switch, each said thermal means being controlled by said switch.

2. In a thermally operated regulating and indicating instrument, an element rotatable in response to electrical values, a contact arm carried by said element and forming a portion of an electric circuit to be controlled, a fixed plate having contacts arranged beneath said arm, a reciprocatory member arranged above and adapted to move said arm into contact with said contacts, thermally actuated means for causing reciprocating movement of said member, bi-metallic coils supported within the instrument, a spindle connected for rotation by said coils, and an oscillating switch operable by said spindle to control the flow of current to said coils and to control movement of said reciprocating member.

3. In a thermally operated regulating and indicating instrument, an element rotatable in response to electrical values, a contact arm carried by said element and forming a portion of an electric circuit to be controlled, a fixed plate having contacts arranged beneath said arm, a reciprocatory member arranged above and adapted to move said arm into contact with said contacts, thermally actuated means for causing reciprocating movement of said member, bi-metallic coils supported within the instrument, a spindle connected for rotation by said coils, a tilting plate actuated by rotation of said spindle, and switch means associated with and operable upon movement of said tilting plate to control the flow of current to said coils.

4. In a regulating and indicating instrument, an arm rotatable in response to electrical values, a plate having contact members affixed thereto and forming elements of electric circuits to be controlled, a member arranged for reciprocatory movement to effect contact of said arm with the said members, thermally-actuated means for causing said reciprocatory movement, a switch arranged to be actuated to control the said thermal means, and thermally-actuated means for controlling actuation of said switch, the last said thermally-actuating means being also controlled by said switch.

5. In a regulating and indicating instrument, an arm rotatable in response to electrical values, a plate having contact members affixed thereto and forming elements of electric circuits to be controlled, a member arranged for reciprocatory movement to effect contact of said arm with said members, thermally-actuated means for causing said reciprocatory movement, a switch arranged to be actuated to control the said thermally-actuated means and thermally-actuated means for effecting said actuation of the said switch, each said thermally-actuated means being responsive to said actuation of the said switch.

6. In a regulating and indicating instrument comprising an indicating arm and a switch arm rotatable together in response to electrical values, a plurality of contact members forming elements of electric circuits to be controlled, a member arranged for reciprocatory movement to effect contact of said switch arm with the said contact members, thermally-actuated means for causing said reciprocatory movement, the said thermally-actuated means being responsive to flow of electrical current therethrough, a switch arranged to be actuated to control said flow current through said thermally-actuated means, and thermally-actuated means for effecting said actuation of said switch.

7. In a regulating and indicating instrument comprising an indicating arm and a switch arm rotatable together in response to electrical values, a plurality of contact members forming elements of electric circuits to be controlled, a member arranged for reciprocatory movement to effect contact of said switch arm with said contact members, bi-metallic thermally-actuated means for causing said reciprocatory movement, the said thermally-actuated means being responsive to flow of electric current therethrough, a switch arranged to be actuated to control said flow of electric current through said thermally-actuated means, and thermally-actuated means for effecting said actuation of said switch, the last-mentioned thermally-actuated means being actuated responsive to flow of electric current therethrough.

8. In a regulating and indicating instrument comprising an indicating arm and a switch arm rotatable together in response to electrical values, a plurality of contact members forming elements of electric circuits to be controlled, a member arranged for periodic reciprocatory movements to effect contact of said switch arm with said contact members, bi-metallic thermally-actuated means for causing said reciprocatory movements, the said thermally-actuated means being responsive to flow of electric current therethrough, a switch arranged to be actuated to control said flow of electric current through the said thermally-actuated means, and thermally-actuated means for effecting said actuation of the said switch, the last-mentioned thermally-actuated means being actuated responsive to flow of electric current therethrough, the last-mentioned thermally-actuated means being operative also to effect periodic flow of said current through the said first-mentioned thermally-actuated means.

9. In a regulating and indicating instrument comprising an indicating member and a switch member movable together in response to electrical values, a switch contact member forming an element of an electric circuit to be controlled, an element arranged for periodic movements to effect connection and disconnection of said switch member with said switch contact member, bi-metallic thermally-actuated means for causing said periodic movements, the said thermally-actuated means being responsive to flow of electric current therethrough, another thermally-actuated means arranged to effect periodic flow of said current through the first mentioned said thermally-actuated means, the actuation of the said another thermally-actuated means being responsive to periodic flow of electric current therethrough and arranged to control such last periodic flow of current, and a switch arranged to be actuated to control said periodic flow of current through each said thermally-actuated means, the actuation of said switch being responsive to actuation of the said another thermally-actuated means.

In testimony whereof I have hereunto subscribed my name this 17th day of May A. D. 1927, at Zurich, Switzerland.

FRITZ SIEBER.